(12) United States Patent
Ninomiya

(10) Patent No.: US 12,326,595 B2
(45) Date of Patent: Jun. 10, 2025

(54) OPTICAL SIGNAL DEVICE

(71) Applicant: Senko Advanced Components, Inc., Hudson, MA (US)

(72) Inventor: Takuya Ninomiya, Natick, MA (US)

(73) Assignee: Senko Advanced Components, Inc., Hudson, MA (US)

( * ) Notice: Subject to any disclaimer, the term of this patent is extended or adjusted under 35 U.S.C. 154(b) by 0 days.

(21) Appl. No.: 17/814,898

(22) PCT Filed: Feb. 25, 2021

(86) PCT No.: PCT/US2021/019601
§ 371 (c)(1),
(2) Date: Jul. 26, 2022

(87) PCT Pub. No.: WO2021/173793
PCT Pub. Date: Sep. 2, 2021

(65) Prior Publication Data
US 2024/0231000 A1 Jul. 11, 2024

Related U.S. Application Data

(60) Provisional application No. 62/981,448, filed on Feb. 25, 2020.

(51) Int. Cl.
*G02B 6/30* (2006.01)
*G02B 6/38* (2006.01)

(52) U.S. Cl.
CPC ............. *G02B 6/30* (2013.01); *G02B 6/3817* (2013.01); *G02B 6/3897* (2013.01)

(58) Field of Classification Search
CPC ...... G02B 6/30; G02B 6/3817; G02B 6/3897; G02B 6/3893
See application file for complete search history.

(56) References Cited

U.S. PATENT DOCUMENTS

| | | | |
|---|---|---|---|
| 6,461,053 B1 | 10/2002 | Mayercik et al. | |
| 6,954,592 B2 | 10/2005 | Tan et al. | |
| 7,575,380 B2 * | 8/2009 | Wang | G02B 6/4201 439/577 |
| 9,678,287 B2 * | 6/2017 | Rossi | G02B 6/3821 |
| 2010/0260503 A1 | 10/2010 | Zhovnirovsky et al. | |
| 2011/0222821 A1 | 9/2011 | Pitwon et al. | |

(Continued)

OTHER PUBLICATIONS

PCT International Searching Authority, International Search Report and Written Opinion, dated Jun. 9, 2021, International Application No. PCT/US/21/19601, 12 pages.

(Continued)

*Primary Examiner* — Jennifer Doan

(57) ABSTRACT

An optical signal device for connecting to a receptacle of an optical motherboard includes an optical module and an optical connector coupled to the optical module. The optical connector attaches to the receptacle of the optical motherboard to optically connect the optical module to the optical motherboard. The optical connector has a first optical interface axis and a second optical interface axis different from the first optical interface axis. The optical connector is configured to convey optical signals to and/or from the optical motherboard along at least one of the first or second optical interface axes.

15 Claims, 7 Drawing Sheets

(56) References Cited

U.S. PATENT DOCUMENTS

2013/0336617 A1 12/2013 Otte et al.
2019/0384005 A1 12/2019 Brusberg et al.

OTHER PUBLICATIONS

Senko Advanced Components (Euro) Ltd., "BLADES" Board Level Aggregation of Disruptive Exchangeable Subsystems for Integrated Photonics, Call: H2020-ICT-36-2020, Topic: Disruptive photonics technologies, Jun. 17, 2020, 70 pages.

* cited by examiner

OPTICAL SIGNAL DEVICE

CROSS-REFERENCE TO RELATED APPLICATION

This application is a 35 U.S.C § 371 National Stage Entry of International Application No. PCT/US21/19601, filed Feb. 25, 2021, which claims the benefit of priority to U.S. Provisional App. No. 62/981,448, filed Feb. 25, 2020, the entireties of both of which are hereby incorporated by reference.

FIELD

The present disclosure generally relates to optical connections, and, more specifically, to an optical signal connector.

BACKGROUND

Optical signal connectors are used within optical communication networks to interconnect optical signal guides, such as fiber optic cables, optical waveguides, etc., to optical devices.

SUMMARY

In one aspect, an optical signal device for connecting to a receptacle of an optical motherboard comprises an optical module and an optical connector coupled to the optical module. The optical connector is configured to attach to the receptacle of the optical motherboard to optically connect the optical module to the optical motherboard. The optical connector has a first optical interface axis and a second optical interface axis different from the first optical interface axis. The optical connector is configured to convey optical signals to and/or from the optical motherboard along at least one of the first or second optical interface axes.

In another aspect, an optical signal waveguide connector for connecting an optical waveguide to a receptacle of an optical motherboard comprises a connector housing configured to receive a terminal end of the waveguide. The connector housing is also configured to attach to the receptacle of the optical motherboard to optically connect the optical signal waveguide connector to the optical motherboard. The connector housing has a first optical interface axis and a second optical interface axis different from the first optical interface axis. The optical connector is configured to convey optical signals to and/or from the optical motherboard along at least one of the first or second optical interface axes.

Other objects and features of the present disclosure will be in part apparent and in part pointed out hereinafter.

BRIEF DESCRIPTION OF THE DRAWINGS

Corresponding reference characters indicate corresponding parts throughout the drawings.

DETAILED DESCRIPTION

Figures 1A, 1B:
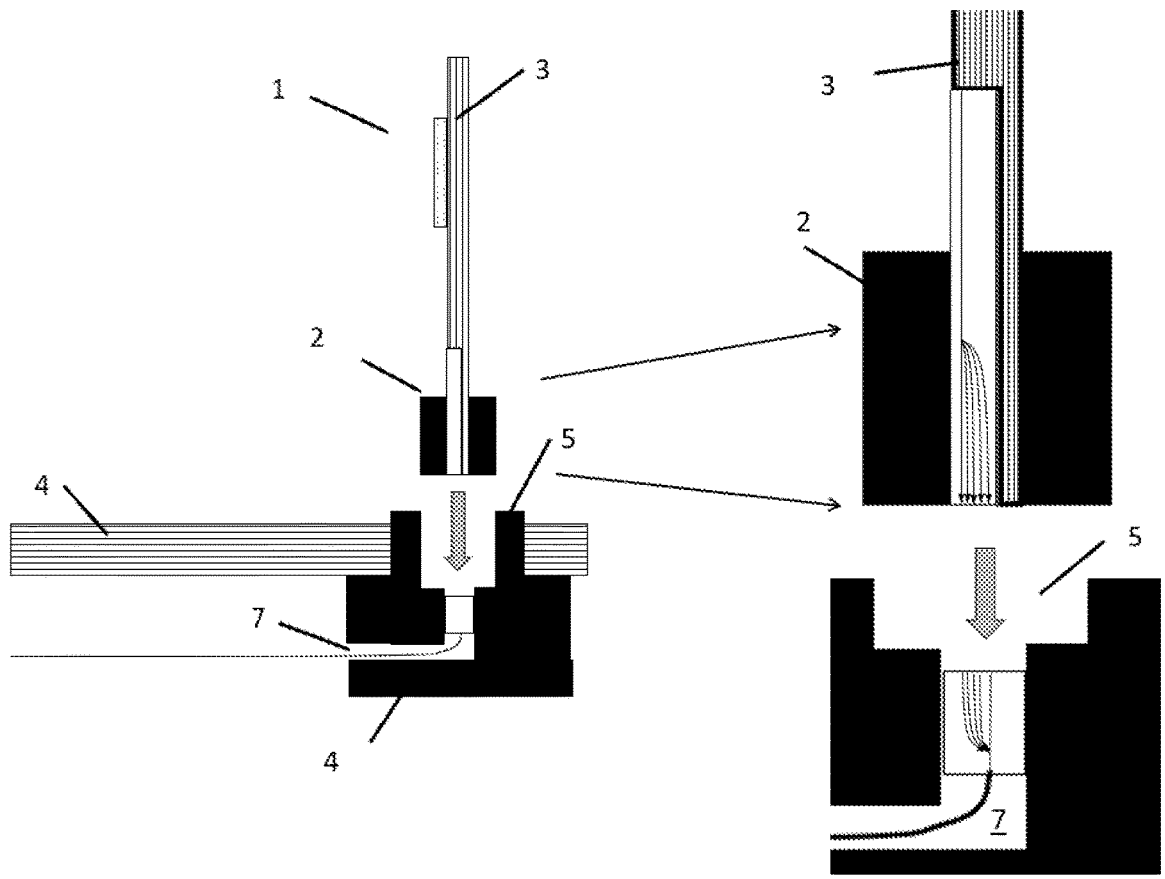
FIG. 1A is a schematic vertical section of a first type of conventional receptacle of an optical motherboard with a conventional optical signal device being connected thereto.
FIG. 1B is an enlarged fragment of FIG. 1A showing additional details.
Figures 2A, 2B:
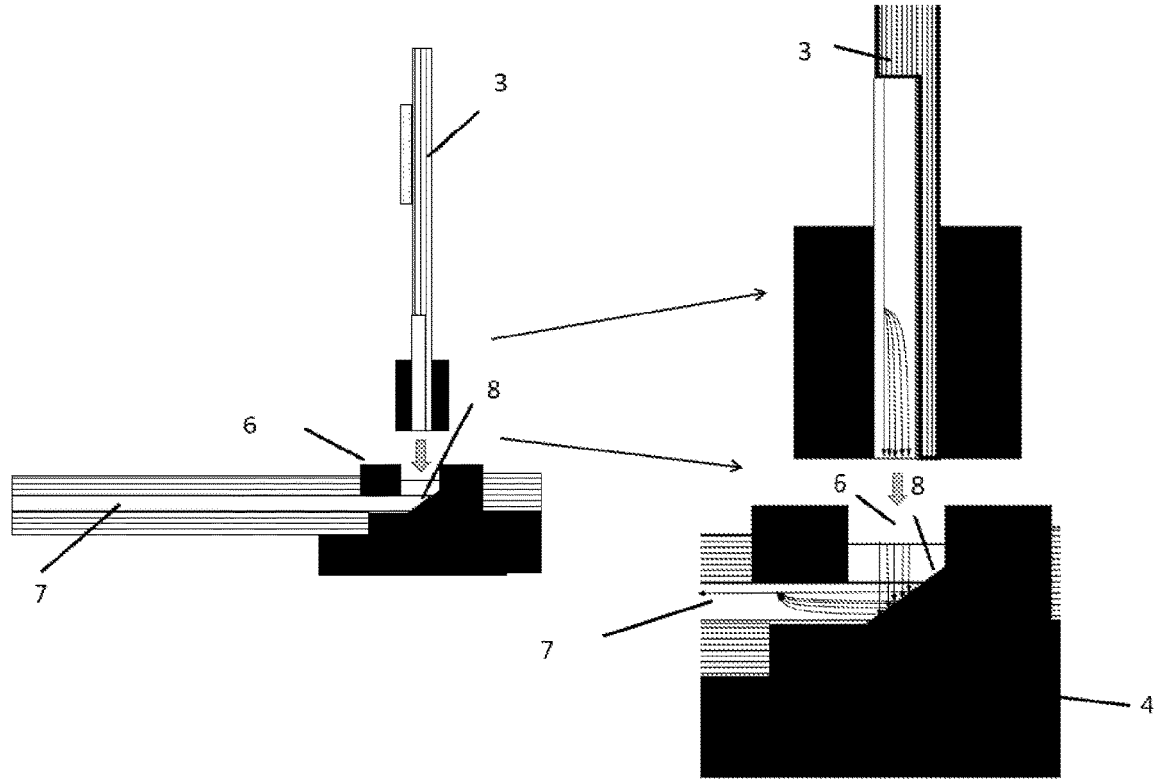
FIG. 2A is a schematic vertical section of a second type of conventional receptacle of an optical motherboard with a conventional optical signal device being connected thereto.
FIG. 2B is an enlarged fragment of FIG. 2A showing additional details.
Figure 3:
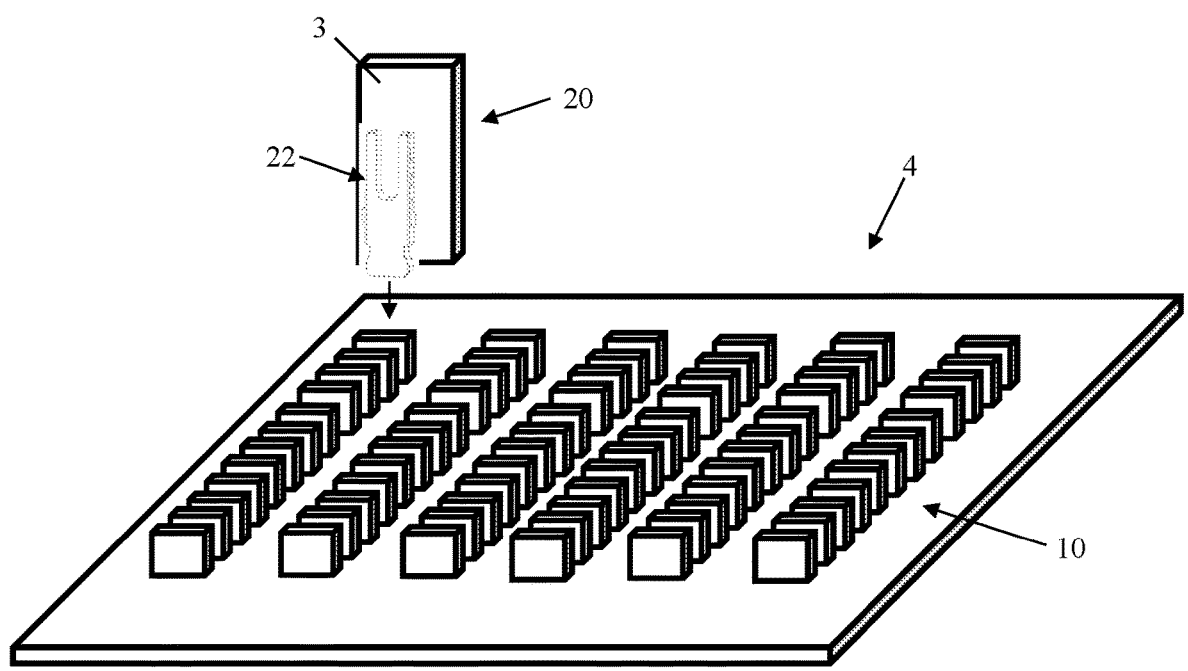
FIG. 3 is a schematic illustration of an optical signal device according to one embodiment of the present disclosure being connected to an optical motherboard.

Referring to FIGS. 1A and 2B, a conventional optical signal device is shown at reference numeral 1. The optical signal device 1 includes a known optical signal connector 2 connected to and supporting an optical module 3. The known optical signal connector 2 mounts the optical module 3 on an optical motherboard 4 (e.g., an electro-optical motherboard) to optically connect the optical module to the optical motherboard. In a typical situation, the motherboard would have places to receive a number of optical modules 3. Optical modules are generally known in the art and may comprise one or more of a printed circuit board ("PCB"), microprocessors, computer memory and/or other electronic components. The optical module 3 includes an optical transceiver, an optical receiver, and/or an optical transmitter for receiving and/or sending optical signals to and/or from the optical motherboard 4. Other configurations of the optical module 3 are within the scope of the present disclosure. In one embodiment the optical module can be a thin card configured to be attaching to an electro-optical host (or "mother") board so that the thin card is oriented generally perpendicular to the motherboard. For example, the thin card, sometimes referred to as a "blade," may incorporate photonic integrated circuits and enhanced electro-optical circuit boards, and be configured for easy, releasable connection to the motherboard.

Referring to FIGS. 1A and 1B, the optical motherboard 4 includes a first type of conventional receptacle 5. The conventional optical signal connector 2 attaches to the first type of conventional receptacle 5 to mount the optical signal device 1 to the optical motherboard 4 and optically connect the optical module 3 to the optical motherboard. The optical motherboard 4 includes one or more optical signal guides or openings 7 for the first type of conventional receptacle 5 for carrying optical signals to and/or from the receptacle and the optical signal connector 2 mounted therein. In FIGS. 1A and 1B, the optical signal guides 7 are fiber optic cables. The fiber optic cables are arranged (e.g., curved) such that the optical signals travel through the end of the conventional optical signal connector 2 (e.g., upward into the connector or downward into the fiber optic cable, as illustrated). In other words, the conventional optical signal connector 2 receives and/or transmits optical signals through its end (e.g., generally parallel to the direction of movement for attaching the optical signal device 1 to the receptacle 5).

Referring to FIGS. 2A and 2B, the optical motherboard 4 includes a second type of conventional receptacle 6. The conventional optical signal connector 2 attaches to the second type of conventional receptacle 6 to mount the optical signal device 1 to the optical motherboard 4 and optically connect the optical module 3 to the optical motherboard. The optical motherboard 4 includes one or more optical signal guides 7 (for example a glass or polymer waveguide) for the second type of conventional receptacle 6 for carrying optical signals to and/or from the receptacle and the optical signal connector 2 mounted therein. In FIGS. 2A and 2B, the optical signal guides 7 are optical waveguides. The optical waveguides are arranged such that the optical signals travel generally perpendicular to the direction of movement for attaching the optical device 2 to the receptacle 6. Because the conventional optical signal connector 2 receives and/or transmits optical signals through its end, the second type of conventional receptacle 6 includes a mirror 8 to turn the optical signals. The mirror 8 directs the optical signals from the optical waveguide into the optical signal connector 2 (e.g., upward into the end of the connector) and from the optical signal connector (e.g., downward from the end of the connector) to the optical waveguide. The optical motherboard 4 may include both types of receptacles 5, 6.

Referring to FIGS. 3-10, an optical signal device according to one embodiment of the present disclosure is generally indicated at 20. The optical signal device 20 includes an optical signal connector 22 (e.g., an optical connector, an optical signal waveguide connector) connected to an optical module 3. The optical connector 22 mounts the optical module 3 to an optical motherboard 4 to optically connect the optical module to the optical motherboard. The optical connector 22 may also form other connections, such as electrical connections, between the optical module 3 and the optical motherboard 4.

Figure 9:
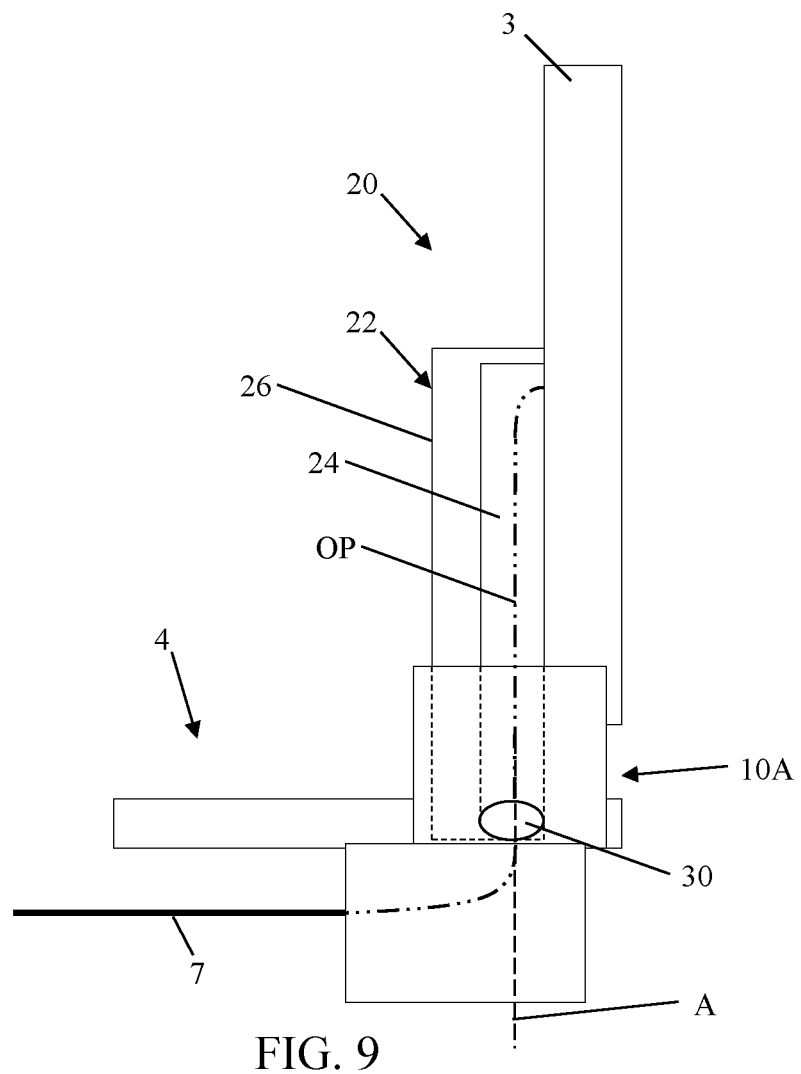
FIG. 9 is a schematic side illustration of the optical signal device attached to an end transmission receptacle of an optical motherboard.
Figure 10:
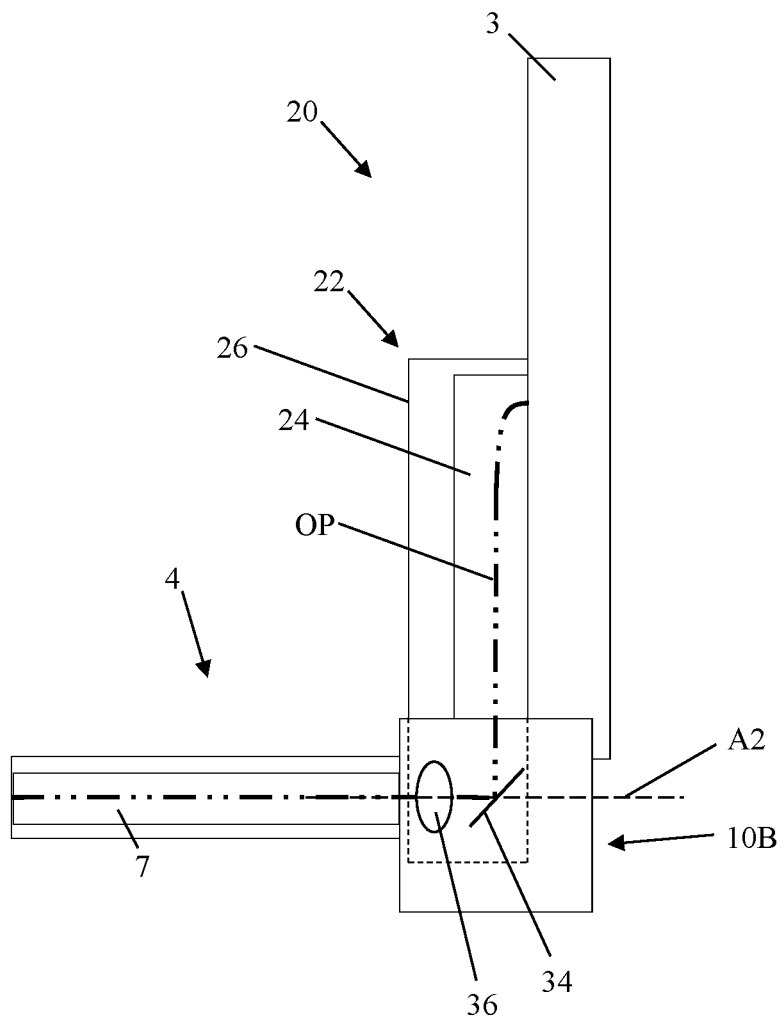
FIG. 10 is a schematic side illustration of the optical signal device attached to a side transmission receptacle of an optical motherboard.

The optical signal device 20 connects to a receptacle 10 of the optical motherboard. Specifically, the optical connector 22 is configured to attach to the receptacle 10 of the optical motherboard 4 to optically connect the optical module 3 to the optical motherboard. In particular, the optical connector 22 is configured to attach to two different types of receptacles 10A, 10B (FIGS. 9 and 10). The optical motherboard 4 can include a plurality of receptacles 10 (FIG. 3) and a plurality of each type of receptacles 10A, 10B (e.g., first and second receptacles). Referring to FIG. 9, the first type of receptacle 10A is an end transmission receptacle, which means the optical signals travel through the end of the optical connector, such as the optical connector 22 of FIGS. 3-10, when the optical connector is attached to the receptacle. The optical signal guide 7 of the optical motherboard 4 associated with the end transmission receptacle 10A is a fiber optic cable, which is able to turn generally upward (after extending generally horizontally in the optical motherboard) to face the end of the optical connector 22 mounted to the end transmission receptacle. Referring to FIG. 10, the second type of receptacle 10B is a side transmission receptacle, which means the optical signals travel through the side of the optical connector, such as the optical connector 22 of FIGS. 3-10, when the optical connector is attached to the receptacle. The optical signal guide 7 of the optical motherboard associated with the side transmission receptacle 10B is an optical waveguide, such as a glass optical waveguide, polymer optical waveguide, etc., which faces the side of the optical connector 22 mounted to the side transmission receptacle. Other configurations of the receptacles and/or optical signal guides are within the scope of the present disclosure.

The optical connector 22 is configured to convey optical signals to and/or from the end transmission receptacle 10A and the side transmission receptacle 10B (broadly, at least one of the types of receptacles). The optical connector 22 has a first optical interface axis A1 (FIG. 9) and a second optical interface axis A2 (FIG. 10). The second optical interface axis A2 is different from the first optical interface axis A1. An optical interface axis (e.g., the first optical interface axis A1, the second optical interface axis A2) is the axis upon which the optical signals travel along as the optical signals are exchanged between the optical connector and a receptacle (e.g., the end transmission receptacle 10A, the side transmission receptacle 10B). Broadly, the optical connector 22 is configured to convey the optical signals to and/or from the optical motherboard 4 along at least one of the first or second optical interfaces axes A1, A2. In the illustrated embodiment, the optical connector 22 can convey optical signals to and/or from the optical motherboard 4 along both the first optical interface axis A1 and the second optical interface axis A2. As a result, the utility of the optical connector 22 is enhanced.

The optical connector 22 is configured to convey the optical signals to and/or from the optical motherboard 4 along either the first optical interface axis A1 or the second optical interface axis A2 based on the receptacle 10 of the optical motherboard 4 (e.g., the receptacle the optical connector is mounted to). For example, the end transmission receptacle 10A (broadly, a receptacle) is configured to transmit optical signals to the optical connector 22 and/or receive optical signals from the optical connector along the first optical interface axis A1. Likewise, the side transmission receptacle 10B (broadly, a receptacle) is configured to transmit optical signals to the optical connector 22 and/or receive optical signals from the optical connector along the second optical interface axis A2. Thus, the optical connector 22 having the same connector housing 26 can be configured to form an optical connection with different types of receptacles 10, even though the optical signals may travel along different optical interfaces axes for each type of receptacle. In other words, the optical connector 22 can be configured to transmit and/or receive optical signals in and/or from different directions. Accordingly, the optical connector 22 can be configured so that the optical signal device 20 is mounted to an end transmission receptacle 10A or configured for mounting on a side transmission receptacle 10B, the optical signal device will be optically connected to the optical motherboard 4. In one embodiment, the first and second optical interface axes A1, A2 may be transverse to each other. In the illustrated embodiment, the first and second optical interface axes A1, A2 are generally perpendicular to each other. Other orientations of the optical interface axes are within the scope of the present disclosure.

Figure 4:
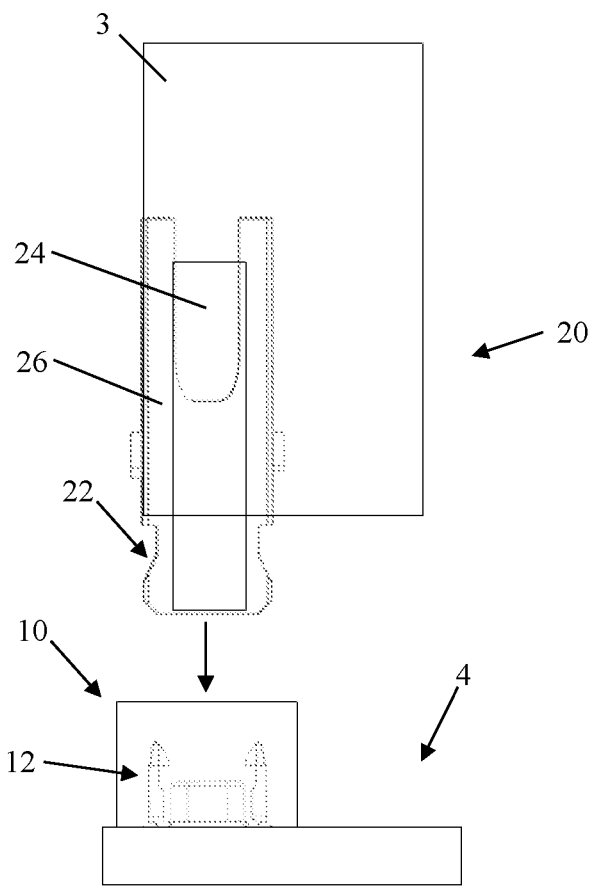
FIG. 4 is a schematic side view of the optical signal device being connected to an optical motherboard.

Referring to FIGS. 4, 9 and 10, the optical connector 22 includes one or more optical signal guides 24 for carrying the optical signals between the optical module 3 and the receptacle 10 of the optical motherboard 4. In the illustrated embodiment, the optical signal guide 24 is an optical waveguide, although other configurations are within the scope of the present disclosure. In the illustrated embodiment, the optical signal guide 24 extends from the optical module 3. FIGS. 9 and 10 show the optical path OP along which the optical signals travel between the optical module 3 of the optical signal device 20 and the optical signal guide 7 of the optical motherboard 4 as a dash-dot-dot-dash line. As shown, the optical signal guide 24 of the optical connector 22 forms at least part of the optical path OP. Accordingly, the optical connector 22 connects the optical signal guide 24 to the receptacle 10 (e.g., either receptacle type 10A, 10B) of the optical motherboard 4. The optical connector 22 includes a connector housing 26. The connector housing 26 is configured to receive the optical signal guide 24. Specifically, the connector housing 26 is configured to receive a terminal end of the optical signal guide 24 (e.g., optical waveguide).

Figure 5:
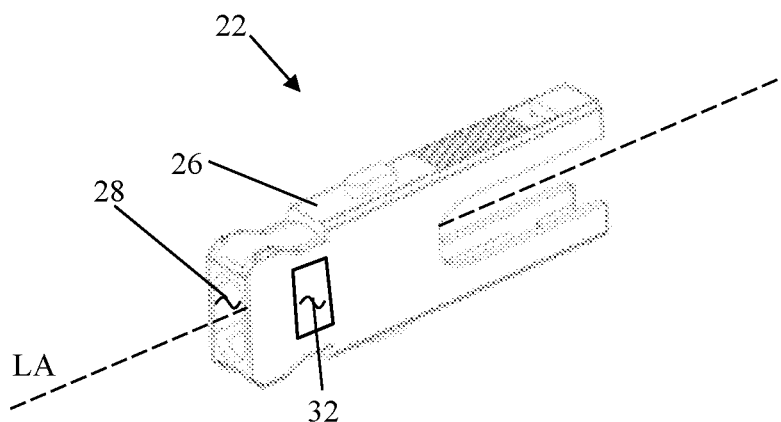
FIG. 5 is a perspective of an optical connector of the optical signal device according to one embodiment of the present disclosure.
Figure 6:
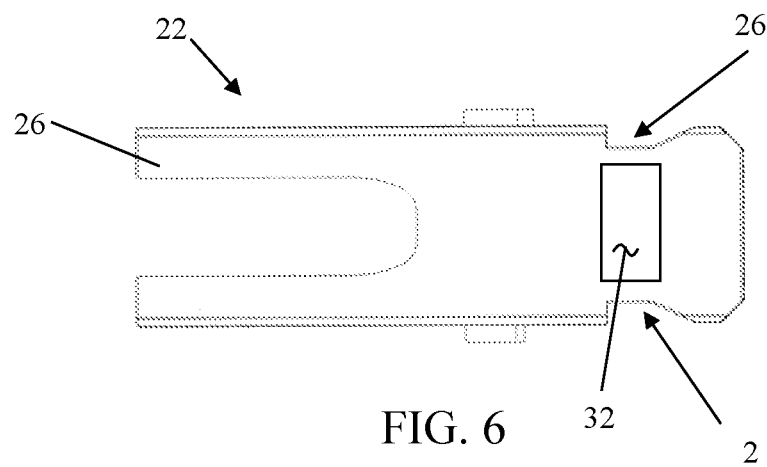
FIG. 6 is side view of the optical connector.
Figure 7:
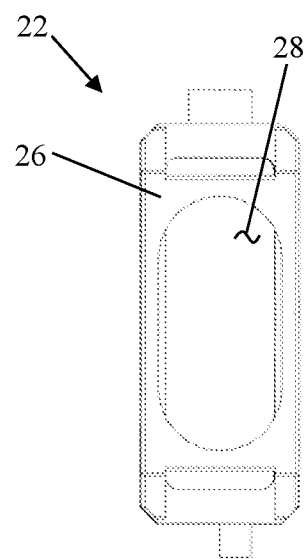
FIG. 7 is an enlarged front view of the optical connector.
Figure 8:
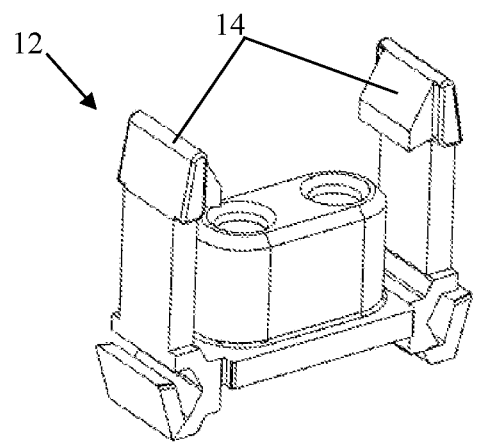
FIG. 8 is a perspective of a receptacle connector of an optical motherboard according to one embodiment of the present disclosure for coupling to the optical connector of FIG. 5.

Referring to FIGS. 5-7, the optical connector 22 (e.g., connector housing 26) includes a longitudinal axis LA. In the illustrated embodiment, the longitudinal axis LA is generally parallel to the first optical interface axis A1. In some embodiments, the longitudinal axis LA may be coincident with the first optical interface axis A1. The optical connector 22 includes (e.g., the connector housing 26 defines) a first opening or window 28. In the illustrated embodiment, the first window 28 is disposed at the end of the optical connector, with the longitudinal axis LA extending through the first window. In particular, the longitudinal axis LA is generally normal to the first window 28. The first window 28 is aligned with the first optical interface axis A1 such that the optical signals pass through the first window when the optical signals travel (e.g., are conveyed) to and/or from the optical motherboard 4 along the first optical interface axis. In one embodiment, the optical connector 22 includes a first lens 30 (FIG. 9) through which the optical signals traveling along the first optical interface axis A1 pass through. The first lens 30 is aligned with the terminal end of the optical signal guide 24 and with the first window 28 along the first optical interface axis A1. In the illustrated embodiment, the first lens 30 is supported by the optical connector 22 (e.g., coupled to the connector housing 26), although other configurations are within the scope of the present disclosure. For example, the first lens 30 could be part of the receptacle 10.

The optical connector 22 includes (e.g., the connector housing 26 defines) a second opening or window 32. In the illustrated embodiment, the second window 32 is disposed adjacent to the end of the optical connector on a side of the connector housing 26. The first window 32 faces in a direction that is transverse (e.g., generally perpendicular) to the longitudinal axis LA. The second window 32 is aligned with the second optical interface axis A2 such that the optical signals pass through the second window when the optical signals travel (e.g., are conveyed) to and/or from the optical motherboard 4 along the second optical interface axis. The optical connector 22 includes a mirror 34 (FIG. 10) aligned with the second window 32 along the second optical interface axis A2. The mirror 34 is configured to redirect an optical signal transmitted to the optical motherboard 4 (e.g., from the optical signal guide 24) along the second optical interface axis A2 and to redirect an optical signal received from the optical motherboard away from the second optical interface axis (e.g., toward the optical signal guide 24). In one embodiment, the optical connector 22 includes a second lens 36 (FIG. 10) through which the optical signals traveling along the second optical interface axis A2 pass through. The second lens 36 is aligned with the second window 32 along the second interface axis A2. In the illustrated embodiment, the second lens 36 is supported by the optical connector 22 (e.g., coupled to the connector housing 26), although other configurations are within the scope of the present disclosure. For example, the second lens 36 could be part of the receptacle 10.

The optical signal guide 24 extends from the optical module 3 toward the first and second windows 28, 32. In the illustrated embodiment, the optical signal guide 24 is generally aligned with the first optical interface axis A1.

Referring to FIGS. 4-8, the optical connector 22 (e.g., connector housing 26) is configured for releasable mechanical connection with the optical motherboard 4 (e.g., receptacle 10). The receptacle 10 may include a receptacle connector 12 for forming the releasable mechanical connection with the optical connector 22. In the illustrated embodiment, the receptacle connector 12 is configured to form a snap-fit connection with the optical connector 22. The receptacle connector 12 includes resiliently deflectable snap-fit retainers 14 that engage recesses 27 formed in the exterior of the connector housing 26 to secure the optical connector 22 to the receptacle 10. In the illustrated embodiment, the connector housing 26 and the receptacle connector 12 are similar to components described in U.S. Patent Publication No. 2020/0333537. However, it is understood that other configurations of the connector housing 26 and/or the receptacle connector 12 are within the scope of the present disclosure. The optical connector 22 is generally moved along the longitudinal axis LA to attach the optical connector to the receptacle 10 and to detach the optical connector from the receptacle. The user provides enough force to sufficiently deflect the snap-fit retainers 14 to attach the optical connector 22 to the receptacle 10 and to detach the optical connector from the receptacle. In the illustrated embodiment, the optical connector is a SN type optical connector having the same footprint as an SN optical connector.

Modifications and variations of the disclosed embodiments are possible without departing from the scope of the invention defined in the appended claims. For example, where specific dimensions are given, it will be understood that they are exemplary only and other dimensions are possible.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. An optical signal device for connecting to a receptacle of an optical motherboard, the optical signal device comprising:
   an optical module; and
   an optical connector coupled to the optical module, the optical connector configured to attach to the receptacle of the optical motherboard to optically connect the optical module to the optical motherboard, the optical connector having a first optical interface axis and a second optical interface axis different from the first optical interface axis, wherein the optical connector is configured to convey optical signals to and/or from the optical motherboard along at least one of the first or second optical interface axes,
   wherein the optical connector includes a second window aligned with the second optical interface axis such that the optical signals pass through the second window when the optical signals travel to and/or form the optical motherboard along the second optical interface axis, wherein the optical connector includes an optical waveguide extending from the optical module to toward the second window, and a mirror aligned with the second window along the second optical interface axis.

2. The optical signal device of claim 1, wherein the optical connector is configured to convey optical signals to and/or from the optical motherboard along either the first optical interface axis or the second optical interface axis based on the receptacle of the optical motherboard.

3. The optical signal device of claim 2, in combination with the receptacle, wherein the receptacle is configured to transmit optical signals to the optical connector and/or receive optical signals from the optical connector along the first optical interface axis.

4. The optical signal device of claim 2, in combination with the receptacle, wherein the receptacle is configured to transmit optical signals to the optical connector and/or receive optical signals from the optical connector along the second optical interface axis.

5. The optical signal device of claim 1, wherein the first and second optical interface axes are transverse to each other.

6. The optical signal device of claim 5, wherein the first and second optical interface axes are generally perpendicular to each other.

7. The optical signal device of claim 1, wherein the optical connector includes an optical waveguide extending from the optical module and a first window aligned with the first optical interface axis such that the optical signals pass through the first window when the optical signals travel to and/or from the optical motherboard along the first optical interface axis.

8. The optical signal device of claim 1, wherein the mirror is configured to redirect an optical signal transmitted to the optical motherboard along the second optical interface axis and to redirect an optical signal received from the optical motherboard away from the second optical interface axis.

9. The optical signal device of claim 1, further comprising a second lens aligned with the second window along the second interface axis through which the optical signals traveling along the second interface axis pass through.

10. The optical signal device of claim 9, wherein the second lens is supported by the optical connector.

11. The optical signal device of claim 7, further comprising first lens aligned with a terminal end of the optical waveguide and with the first window along the first optical interface axis through which the optical signals traveling along the first optical interface axis pass through.

12. The optical signal device of claim 11, wherein the first lens is supported by the optical connector.

13. The optical signal device of claim 7, wherein the optical connector includes a second window aligned with the second optical interface axis such that the optical signals pass through the second window when the optical signals travel to and/or form the optical motherboard along the second optical interface axis.

14. The optical signal device of claim 13, further comprising a second lens aligned with the second window along the second interface axis through which the optical signals traveling along the second interface axis pass through.

15. The optical signal device of claim 14, wherein the second lens is supported by the optical connector.

* * * * *